(12) United States Patent
McDonald

(10) Patent No.: US 11,460,111 B2
(45) Date of Patent: Oct. 4, 2022

(54) ARRANGEMENT FOR SEALING A PIVOT JOINT

(71) Applicant: Brian Cameron McDonald, Grenfell (CA)

(72) Inventor: Brian Cameron McDonald, Grenfell (CA)

(*) Notice: Subject to any disclaimer, the term of this patent is extended or adjusted under 35 U.S.C. 154(b) by 939 days.

(21) Appl. No.: 16/244,643

(22) Filed: Jan. 10, 2019

(65) Prior Publication Data
US 2019/0257428 A1 Aug. 22, 2019

Related U.S. Application Data

(60) Provisional application No. 62/633,711, filed on Feb. 22, 2018.

(51) Int. Cl.
| F16J 15/3252 | (2016.01) |
| F16J 15/00 | (2006.01) |
| F16C 11/04 | (2006.01) |

(52) U.S. Cl.
CPC .......... F16J 15/3252 (2013.01); F16C 11/04 (2013.01); F16J 15/002 (2013.01); F16C 2326/20 (2013.01)

(58) Field of Classification Search
CPC .... F16J 15/00; F16J 15/16; F16J 15/50; F16J 15/52; F16J 15/30; F16J 15/3204; F16J 15/3248; F16J 15/3252; F16J 15/3256; F16J 15/326; F16J 15/3264; F16J 15/002; F16J 15/162; F16J 15/40; F16C 11/00; F16C 11/04; F16C 11/045; F16C 2326/00; F16C 2326/20; F16C 2326/24; F16C 2326/26; F16C 2326/28

USPC ........................................................ 403/105
See application file for complete search history.

(56) References Cited

U.S. PATENT DOCUMENTS

| 3,589,780 | A | * | 6/1971 | Thompson | .......... F16C 32/0696 384/291 |
| 5,884,363 | A | * | 3/1999 | Tofts | ..................... E05D 15/242 16/104 |
| 8,770,675 | B2 | * | 7/2014 | Vom Stein | ........... F16J 15/3456 305/105 |
| 9,493,198 | B2 | * | 11/2016 | Vom Stein | ............. F16J 15/344 |

FOREIGN PATENT DOCUMENTS

ES 2734360 T3 * 12/2019 ............. A01G 23/00

* cited by examiner

*Primary Examiner* — Nathan Cumar
(74) *Attorney, Agent, or Firm* — Christopher J. Dynowski; Ryan W. Dupuis; Ade & Company Inc.

(57) ABSTRACT

A pivot joint comprises a pivot pin mounted to a first member and a second member with a housing defining a bore receiving the pivot pin, thus forming a pivot axis for pivotal movement of one member relative to the other. A resilient toroidal gasket is provided at either end of the housing in the bore at axially spaced positions of the pivot pin, and a circumferential recess receives each gasket in fixed axial location along the pivot pin. The gasket spans radially of the pivot pin from a base of the recess and across a circumferential gap formed between an inner surface of the bore and an outer surface of the pin where lubricant is suitably received. Thus the gaskets form a sealed interior of the bore closed at either end by the respective gasket so as to maintain the lubricant therein and contaminants out.

7 Claims, 5 Drawing Sheets

ARRANGEMENT FOR SEALING A PIVOT JOINT

This applications claims the benefit under 35 U.S.C. 119(e) of U.S. Provisional Application Ser. No. 62/633,711 filed Feb. 22, 2018, which is incorporated by reference herein.

FIELD OF THE INVENTION

The present invention relates to an arrangement for sealing a pivot joint formed by a pin rotating in a tubular sleeve providing relative pivotal movement between two components so to retain lubricating grease inside and dirt/debris outside the joint, and more specifically to an arrangement of this type using simple toroidal gaskets to form a relatively simple seal to trap grease inside a pivot joint.

BACKGROUND

Pivot joints are commonplace in dynamic mechanical structures where two parts of a structure are pivotally joined so that one can move in pivotal motion relative to the other about an axis defined by the joint. This is often formed by providing a pin which is mounted to a first component and which passes through a bore formed in a second component, where the pin defines the pivot axis of pivotal movement of one component in relation to the other.

Typically lubricant in the form of lubricating grease is disposed at an interface defined between the pin and an interior surface of the bore so as to reduce friction at this interface and enable smooth pivotal movement.

Oftentimes the mechanical structures employing these types of joints are used in environments where they are subject to dirt and debris, which material can contaminate the lubricant so as to cause wear of the components at the pivot joint.

Conventionally there is no barrier for trapping the lubricating grease inside the pivot joint and keeping contaminants such as the dirt/debris outside of same.

SUMMARY OF THE INVENTION

According to an aspect of the invention there is provided a pivot joint comprising:

a pivot pin;

a first member carrying a pair of upstanding sides opposite one another with inner surfaces in transversely spaced relation to one another so as to define a space therebetween;

each of the upstanding sides defining an aperture receiving the pivot pin spanning transversely across the space such that the pivot pin is operatively mounted to the first member;

a second member carrying a housing defining a bore which receives the pivot pin so that the pivot pin defines an axis of pivotal movement of the second member relative to the first member;

the housing being located in the space between the opposite upstanding sides of the first member;

opposite ends of the housing which face away from one another being spaced from the inner surfaces of the upstanding sides;

the bore being defined from one of the opposite ends of the housing to the other one thereof;

a circumferential gap formed along a length of the bore between an outer surface of the pivot pin and an inner surface of the bore that is suited for receiving lubricant;

a resilient toroidal gasket at each of the opposite ends of the housing located in the bore at axially spaced positions of the pivot pin;

a circumferential recess receiving each gasket in fixed axial location along the pivot pin, the recess being defined in one of the pivot pin or the housing;

the recess including a base recessed from the circumferential gap in a radial direction of the pivot pin;

the gasket spanning radially of the pivot pin from the base of the recess and across the gap so as to form a sealed interior of the bore closed at either end by the respective gasket.

This arrangement provides a relatively simple arrangement for sealing the lubricated area of a pivot joint so as to keep lubricant in and dirt/debris out. Thus the lubricant may have an extended operating life when it is not lost by leakage out of the bore as well as when it is not degraded by contamination with foreign contaminants such as dirt or debris.

Preferably, there is provided a washer substantially sandwiched between each opposite end of the housing and an adjacent one of the inner surfaces of the first member. The washer acts as a seal on an outside of the housing, keeping larger dirt/debris and other contaminants away therefrom so as to reduce exposure of an outer side of the toroidal gasket seated in the bore to such contaminants. Finer contaminants may still penetrate the seal of the washer, however the toroidal gasket acts to keep these out of the interior of the bore.

In one embodiment, the recess is defined in the pivot pin so that the pivot pin comprises a pair of circumferentially extending grooves oriented perpendicularly transversely to the axis defined by the pivot pin.

In one embodiment, the recess is defined in the housing so that the bore comprises a pair of circumferentially extending grooves oriented perpendicularly transversely to the axis defined by the pivot pin.

Preferably, the gasket is fastened to the housing so as to rotate therewith around the pivot pin while an inner annular periphery of the gasket is disposed in sliding contact with the pivot pin.

Typically, the gasket defines a plane, and the gasket is symmetrically shaped on either side of the plane.

BRIEF DESCRIPTION OF THE DRAWINGS

The invention will now be described in conjunction with the accompanying drawings in which.

In the drawings like characters of reference indicate corresponding parts in the different figures.

DETAILED DESCRIPTION

Figure 1:
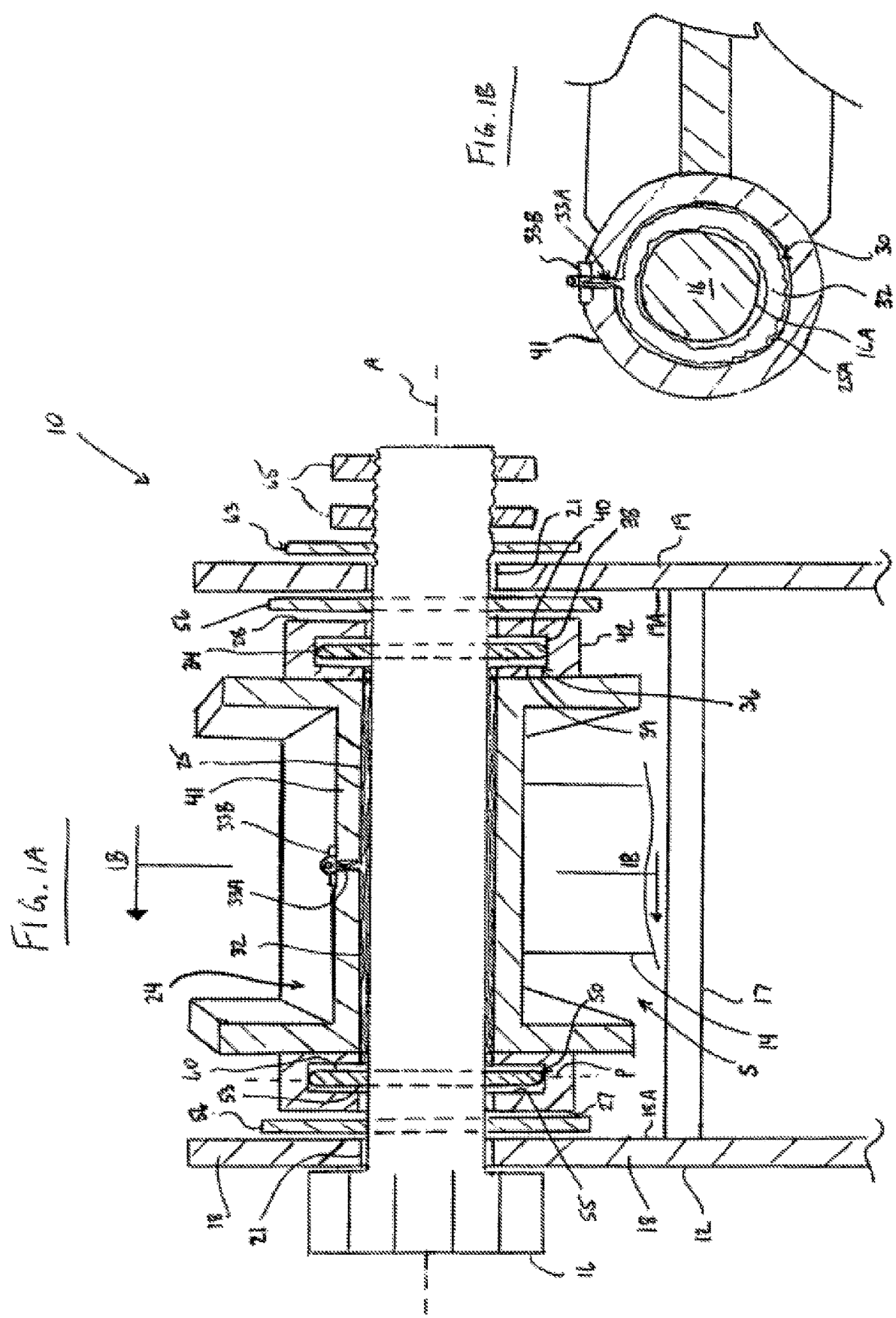
FIGS. 1A and 1B, the latter of which is taken along line 1B-1B in FIG. 1A, illustrate generally schematic sectional views of a first arrangement of pivot joint according to the present invention.

The accompanying figures show a pivot joint 10 formed between a first stationary member 12 and a second movable member 14. That is, in relative pivotal movement it is the second member 14 which generally moves relative to the first member 12. One example of where such a pivot joint is found is a skid steer (not shown), or more generally, heavy equipment such as for construction or earthwork which have hydraulically operable components mounted thereon.

The joint 10 comprises a circular cylindrical pivot pin 16 mounted to the stationary member 12 which comprises a base member 17 and upstanding flanges 18, 19 defining upstanding sides which are arranged opposite one another. The flanges 18, 19 have inner surfaces 18A and 19A which face one another and are spaced from one another in a transverse direction of the stationary member.

Each flange 18, 19 further defines an aperture 21 which is aligned with the aperture of the opposite flange so that the pivot pin 16 can be passed through the in-line apertures so as to span transversely across a space S formed between the inner surface 18A, 19A of the opposite upstanding flanges 18, 19 and above the base member 17.

One end 14A of the second movable member 14 is disposed in the space S between transversely spaced apart flanges 18, 19, which end carries a pin housing 24 defining a circular cylindrical bore 25 open at opposite ends 27, 28 of the housing 24. The bore 25 receives the pivot pin 16 relatively snugly so that the housing 24 is retained in a fixed location between the inner surface 18A, 19A of the stationary member and so that the pivot pin 16 defines a pivot axis A of the pivotal movement of the second member 14 relative to the first member 12.

Even though the pivot pin 16 is relatively snugly received in the bore 25 there is provided a slight circumferential gap 30 along a full length of the bore between an outer pin surface 16A and an inner bore surface 25A. In this gap 30, a lubricant 32 such as lubricating grease is received (schematically shown) so as to minimize friction between an interface which otherwise comprises metal-to-metal contact. The lubricant 32 is passed into the gap 30 via a transverse passageway 33A communicating an exterior of the housing 24 with the bore 25. A conventional grease nipple 33B is disposed at an exterior end of the passageway 33A so as to facilitate connection of a lubricant applicator (not shown) to the passageway 33A for inserting the lubricant 32 into the bore 25.

A pair of resilient toroidal gaskets 34 are seated on the pivot pin 16 at axially spaced locations in the bore 25 so that each gasket 34 is arranged at one of the opposite ends 27, 28 of the housing 24, so as to close the opposite ends of the bore thus forming a sealed interior thereof which can keep the lubricant 32 in this enclosed confined space and contaminants such as dirt and debris out of same.

Each gasket 34 defines a plane P and is symmetrically shaped relative to the plane so that opposite portions of the gasket on opposite sides of the plane are mirror images of one another. Thus the gasket may have a circular or rectangular cross-section, for example.

A circumferential recess receives each gasket 34 and maintains same in fixed axial location relative to the pivot pin 16. The recess includes a base which is recessed from the circumferential gap 30, and opposite side walls on either side of the base.

In a first arrangement of the pivot joint as shown in FIGS. 1A and 1B the recess can be defined in the housing 24 as indicated at 36, so as to form a circumferentially extending groove in the bore oriented perpendicularly transversely to the axis A of the pin 16. Thus base 38 of the recess 36 is recessed outwardly from the inner bore surface 25A in a radial direction away from the pivot axis A. Opposite side walls 39, 40 of the recess 36 are axially spaced apart and span radially from the base 38 to the inner bore surface 25A. Thus the outer side wall 40 of the recess, relative to the sealed interior of the bore, forms a circumferential lip which retains the gasket 34 in its fixed axial location relative to the pin in case there is any movement of either one of the first and second members in an axial direction along the pin.

In the first arrangement shown in FIGS. 1A and 1B the recess 36 is defined in an auxiliary body 42 which is added to either end of a conventional pin housing in the form of a cylindrical body 41. The auxiliary bodies 42 are attached to the cylindrical body 41, thereby becoming unitary therewith, so as to provide the recess for the corresponding gasket. For example this auxiliary body may form an aftermarket add-on kit to modify an existing pin housing in the form of a cylindrical body. As such, the pin housing 24 of the arrangement of FIGS. 1A and 1B comprises a cylindrical body 41 and auxiliary bodies 42 attached to the ends of the cylindrical body 41.

Figure 4:
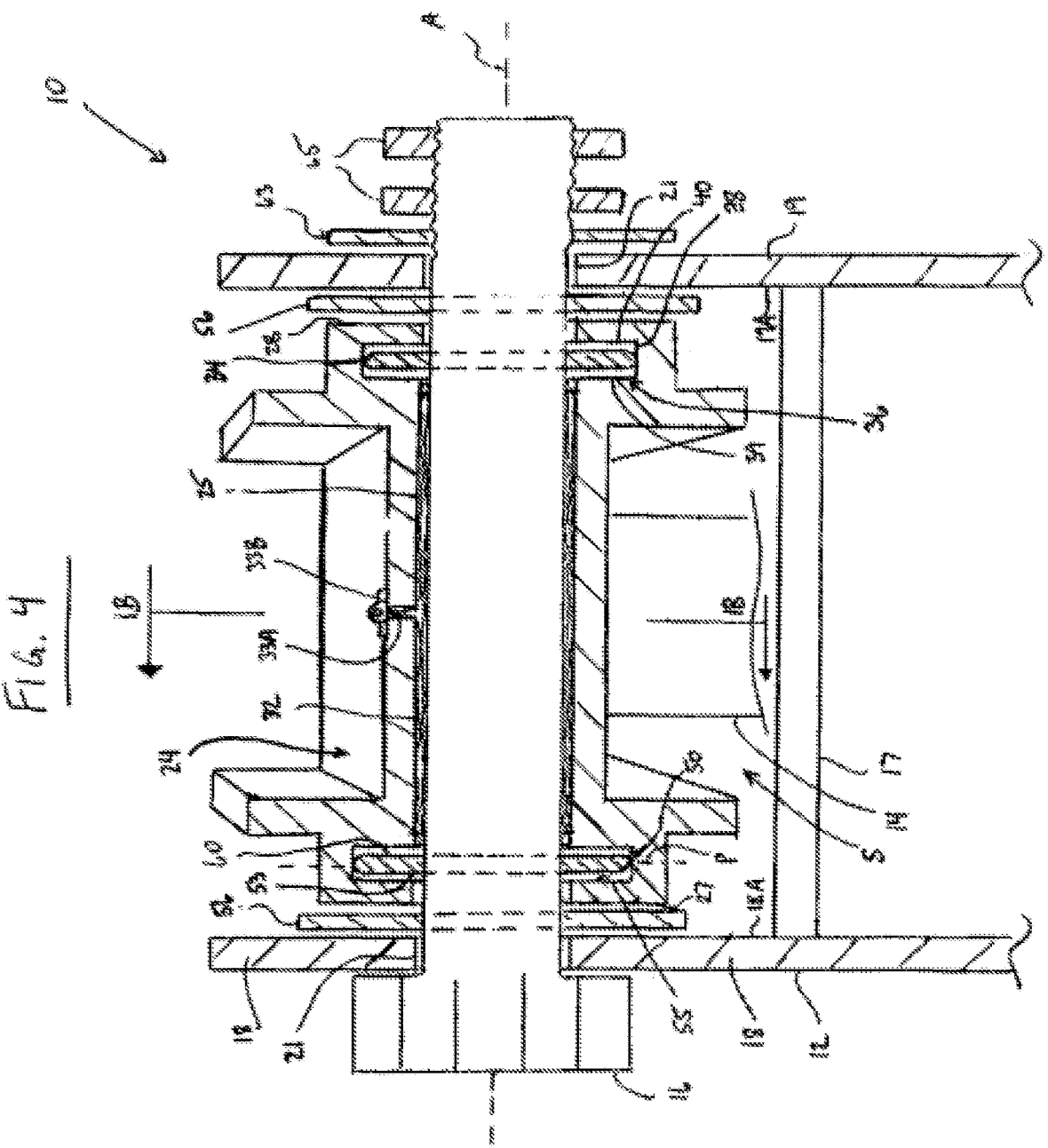
FIGS. 4 and 5 illustrate generally schematic sectional views of further arrangements of the present invention.
Figure 5:
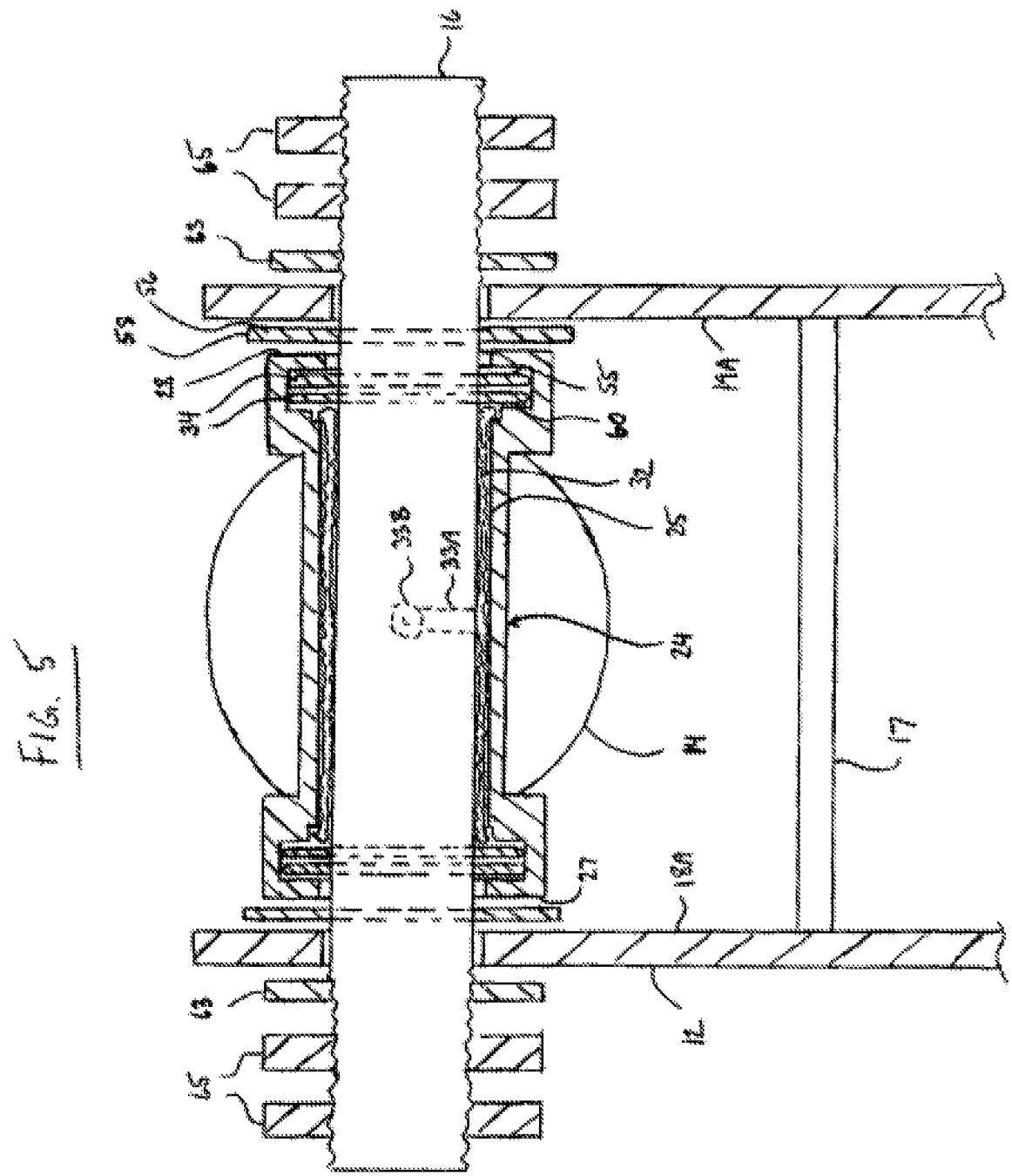

Alternatively, the recess may be formed integrally with the pin housing, as shown in FIGS. 4 and 5.

Figure 2:
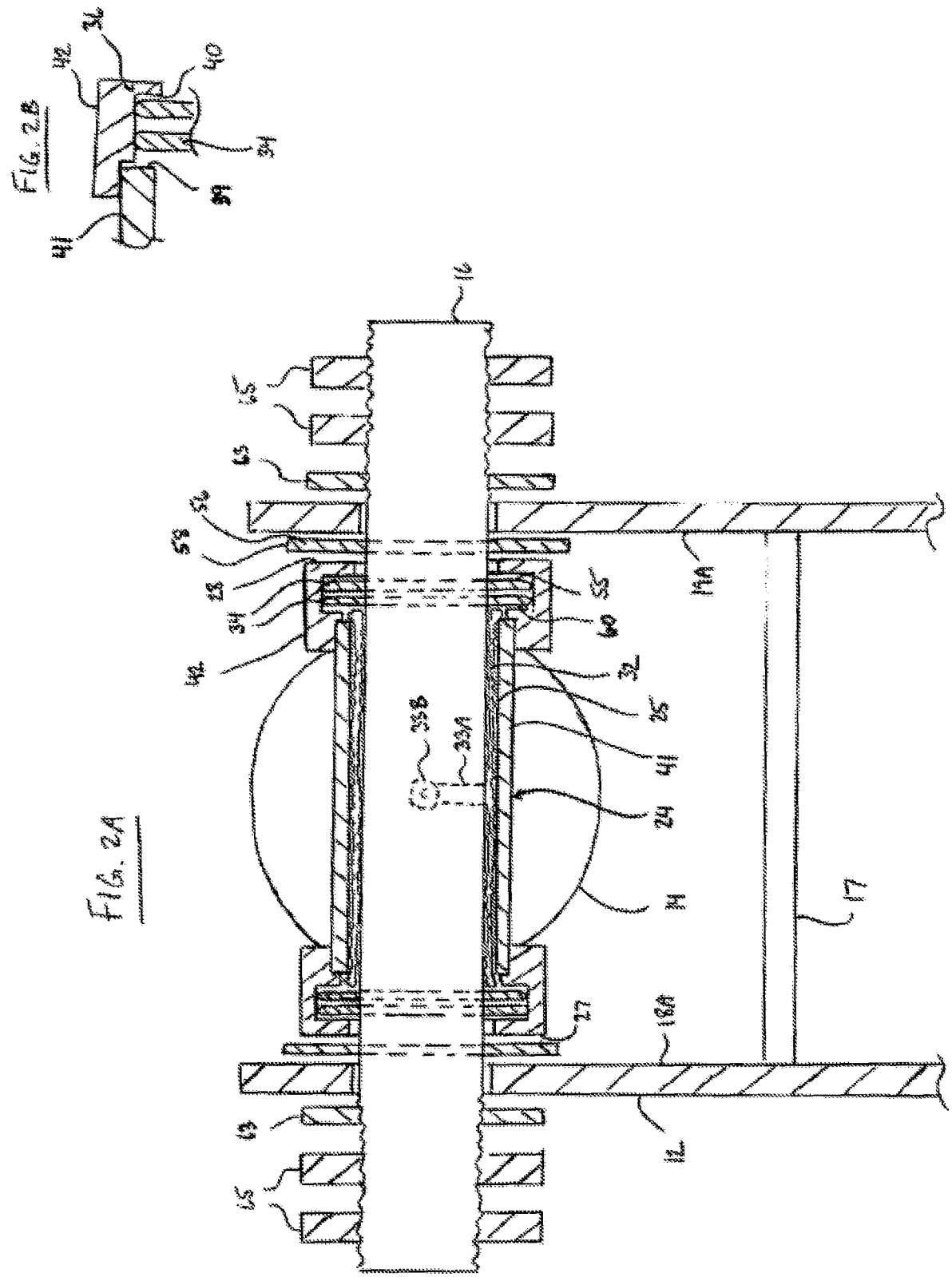
FIGS. 2A and 2B illustrate generally schematic sectional views of variations of the first arrangement of FIG. 1.

FIGS. 2A and 2B show variations of the first arrangement in which there is provided a plurality of gaskets 34 forming a set of gaskets received a common recess. FIG. 2B, which is a close-up view of a portion of the pivot joint, shows a variation in which the cylindrical body 41 defines the inner side wall 39 of the recess 36 which is adjacent the sealed interior of the bore 25, and the opposite outer side wall 40 which is on the other side of the gaskets 34 is defined by the auxiliary body 42.

As shown in FIGS. 1A through 2B, the recesses 36 are generally at the opposite ends 27, 28 of the housing 24. That is, the recesses 36 are located close to but spaced axially inwardly from the ends 27, 28 of the housing 24.

Figure 3:
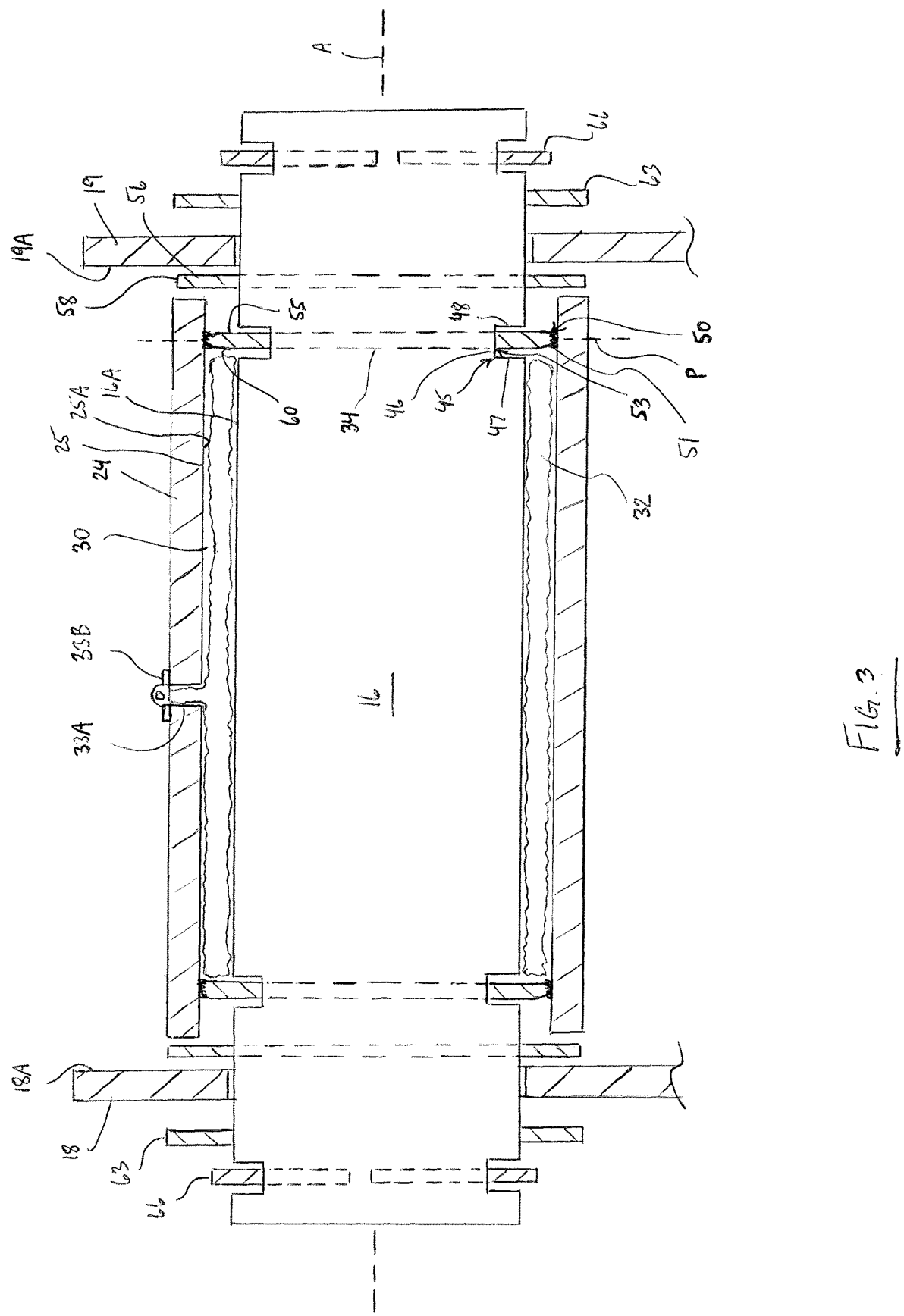
FIG. 3 illustrates a generally schematic sectional view of a second arrangement of pivot joint according to the present invention where some components are omitted for clarity of illustration.

FIG. 3 shows a second arrangement of the pivot joint in which the recess indicated at 45 is defined in the pin and formed integrally therewith so that the pin comprises a circumferentially extending groove with the base indicated at 46 recessed radially inwardly from the outer surface 16A of the pin. Opposite side walls 47, 48 of the recess 45 are axially spaced apart and span radially from the base 46 to the outer pin surface 16A.

Thus the gasket 34 spans radially of the pivot pin 16 from the base of the recess and across the gap 30 to the opposite surface, whether that be the outer pin surface 16A such as in the first arrangement where the recess 36 is defined in the pin housing 24 or the inner bore surface 25A as in the second arrangement where the recess 45 is defined in the pin, so as form a seal at that axial location between the pivot pin and the bore. With such a seal formed at either end of the housing, there is thus provided a sealed bore interior which can retain grease therein and inhibit contaminants from entering same.

The gasket is typically sized to occupy a whole of the corresponding recess such that the gasket spans axially from one sidewall of the recess to the other.

Each gasket 34 is fastened to the pin housing 24 around its outer circumferential periphery 50 for example by adhesive 51 (schematically shown) so that the gaskets are maintained in fixed rotational relation to the housing 24 so as to rotate therewith, while an inner annular periphery 53 of the respective gasket is maintained in frictional engagement with the outer surface of the pin so as to be disposed in sliding contact therewith during the pivotal movement of one member relative to the other.

The gaskets are resilient so that in their seated sealing positions they are compressed slightly between the inner bore surface 25A and the outer pin surface 16A in a direction between their outer and inner annular peripheries of the gasket so as to provide sealable sliding contact at the outer surface 16A of the pin.

To reduce potential for contaminants of reaching an exposed outer side surface 55 of the respective gasket, which is facing outwardly relative to the bore, a washer 56 is provided exterior to the housing 24 substantially sandwiched between the respective end 27, 28 of the housing and the inner surface 18A, 19A adjacent thereto. The washer 56 is sized so that an outer diameter at an outer rim 58 thereof is at least equal to the inner diameter of the bore 25 so that the washer closes and substantially seals the bore externally of the housing. Larger-sized contaminants such as mud may therefore be prevented from passing past the end of the housing 24 and into the bore 25, and finer-sized contaminants such as dust may penetrate but are subsequently blocked from passing deeper into the bore by the gasket 34.

Thus lubricant 32 is maintained within the sealed interior of the bore 25 delimited at its outermost ends by inner side surfaces 60 of the gaskets and between the outer surface 16A of the pin and the inner surface 25A of the bore, and is prevented from exposure to external contaminants such as dirt and debris.

A planar washer 63 and one of lock nuts 65 or a snap ring 66 are provided on an outer side of the upstanding flanges 18, 19 of the stationary member 12 to secure the pin 16 within the pivot joint 10.

Since various modifications can be made in my invention as herein above described, and many apparently widely different embodiments of same made, it is intended that all matter contained in the accompanying specification shall be interpreted as illustrative only and not in a limiting sense.

The invention claimed is:

1. A pivot joint comprising:
    a pivot pin;
    a first member carrying a pair of upstanding sides opposite one another with inner surfaces in transversely spaced relation to one another so as to define a space therebetween;
    each of the upstanding sides defining an aperture receiving the pivot pin spanning transversely across the space such that the pivot pin is operatively mounted to the first member;
    a second member carrying a housing defining a bore which receives the pivot pin so that the pivot pin defines an axis of pivotal movement of the second member relative to the first member;
    the housing being located in the space between the opposite upstanding sides of the first member;
    opposite ends of the housing which face away from one another being spaced from the inner surfaces of the upstanding sides;
    the bore being defined from one of the opposite ends of the housing to the other one thereof;
    a circumferential gap formed along a length of the bore between an outer surface of the pivot pin and an inner surface of the bore that is suited for receiving lubricant;
    a plurality of resilient toroidal gaskets in the bore and seated on the pivot pin at axially spaced positions thereof;
    a pair of circumferential recesses receiving the gaskets in fixed axial location along the pivot pin, the recesses being generally at the opposite ends of the housing such that the recesses are at axially spaced positions of the pivot pin, the recesses being defined in one of the pivot pin or the housing;
    each of the recesses including a base recessed from the circumferential gap in a radial direction of the pivot pin; and
    each of the gaskets spanning radially of the pivot pin from the base of the recess and across the gap so as to form a sealed interior of the bore closed at either end by the respective gasket.

2. The pivot joint of claim 1 wherein there is provided a washer substantially sandwiched between each opposite end of the housing and an adjacent one of the inner surfaces of the first member.

3. The pivot joint of claim 1 wherein the recess is defined in the pivot pin so that the pivot pin comprises a pair of circumferentially extending grooves oriented perpendicularly transversely to the axis defined by the pivot pin.

4. The pivot joint of claim 1 wherein the recess is defined in the housing so that the bore comprises a pair of circumferentially extending grooves oriented perpendicularly transversely to the axis defined by the pivot pin.

5. The pivot joint according to claim 1 wherein the gasket is fastened to the housing so as to rotate therewith around the pivot pin while an inner annular periphery of the gasket is disposed in sliding contact with the pivot pin.

6. The pivot joint according to claim 1 wherein the gasket defines a plane, and the gasket is symmetrically shaped on either side of the plane.

7. The pivot joint according to claim 1 wherein the housing comprises a cylindrical body and auxiliary bodies attached to opposite ends thereof, and wherein each recess is defined in one of the auxiliary bodies.

* * * * *